United States Patent [19]

Smith

[11] 4,410,014
[45] Oct. 18, 1983

[54] FLEXIBLE INSULATED AIR DUCT

[75] Inventor: Clifford D. Smith, Waterville, Ohio

[73] Assignee: Owens-Corning Fiberglas Corporation, Toledo, Ohio

[21] Appl. No.: 362,709

[22] Filed: Mar. 29, 1982

Related U.S. Application Data

[63] Continuation of Ser. No. 168,911, Jul. 14, 1980, abandoned.

[51] Int. Cl.³ .............................................. F16L 9/14
[52] U.S. Cl. .................................... 138/149; 138/125; 138/131; 138/172
[58] Field of Search ............... 138/149, 129, 156, 178, 138/172, DIG. 2, 131, 128, 124–127; 139/420 C, 387 R; 428/109, 247, 255, 285, 920

[56] References Cited

U.S. PATENT DOCUMENTS

| | | | |
|---|---|---|---|
| 3,502,114 | 3/1970 | Hay | 138/109 X |
| 3,513,065 | 5/1970 | Pearson | 428/247 X |
| 4,001,472 | 1/1977 | Thomas et al. | 428/109 |
| 4,006,079 | 2/1977 | Langlois et al. | 210/36 |
| 4,054,710 | 10/1977 | Botsolas | 428/285 |

Primary Examiner—James E. Bryant, III
Attorney, Agent, or Firm—Ronald C. Hudgens; Philip R. Cloutier; Paul J. Rose

[57] ABSTRACT

A glass wool blanket is formed directly on glass fiber scrim for use in flexible insulated air duct with any kind of outer jacket. The scrim-faced wool passes the flame-penetration test of Underwriter's Laboratories Standard UL 181 regardless of the outer jacket material used.

2 Claims, 5 Drawing Figures

FLEXIBLE INSULATED AIR DUCT

This is a continuation of application Ser. No. 168,911, filed July 14, 1980, now abandoned.

TECHNICAL FIELD

This invention relates generally to flexible insulated air duct, and more particularly to scrim-faced glass wool insulation for use in such duct and adapted to pass the Underwriters Laboratories' flame-penetration test described in paragraph 7 of Standard UL 181, thereby permitting use of a plastic film as an outer jacket for duct with assurance that such duct will pass the flame-penetration test.

Flexible insulated air duct commonly includes a core of helical wire encapsulated in plastic film or other material, glass fiber insulation wrapped about the core, and an outer jacket of plastic film. A machine showing how such duct is made is disclosed in U.S. Pat. No. 3,950,213. It has been discovered that such duct does not pass the UL flame- penetration test. One solution would be to use a composite outer jacket material including glass fiber scrim reinforcement. However, such composite jacket material is three to four times as expensive as plastic film.

DISCLOSURE OF INVENTION

In accordance with the invention, a glass fiber scrim is laminated directly to the glass wool insulation during the forming of the glass wool blanket. When such scrim-faced glass wool blanket material is used in a flexible air duct with the scrim toward the outer side, the duct will pass the Underwriter's Laboratories flame-penetration test, paragraph 7 of Standard UL 181, regardless of the material used for the outer jacket.

BRIEF DESCRIPTION OF DRAWINGS

The invention is more fully described hereinafter with reference to the accompanying drawings in which.

BEST MODE OF CARRYING OUT THE INVENTION

Figure 1:
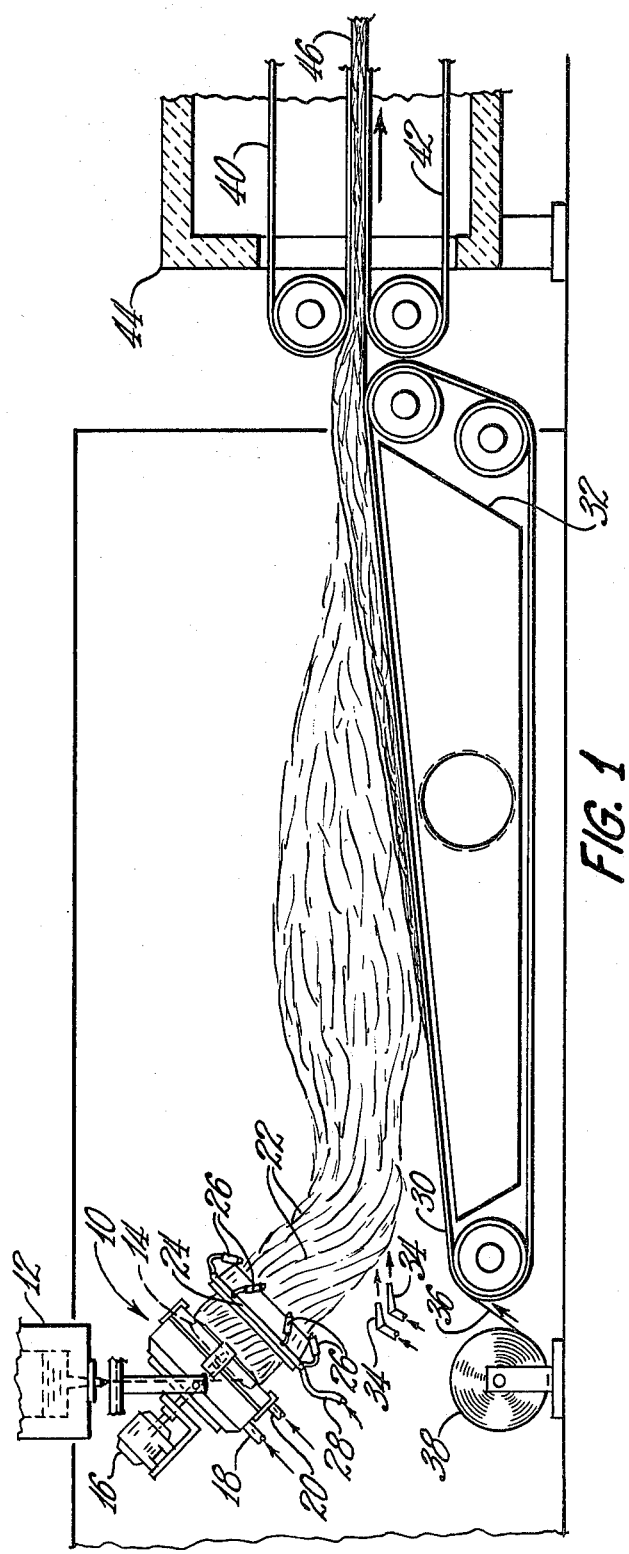
FIG. 1 is a side elevational view illustrating the forming of glass wool blanket on a scrim facing, the product being useful in flexible insulated air duct in accordance with the invention.

With reference to the drawings, FIG. 1 shows a rotary fiberizing unit 10 of the type more fully described in U.S. Pat. No. 3,865,566. Molten glass from a furnace forehearth 12 is fed to a spinner 14 driven by a motor 16. An annular burner associated with the spinner 14 is fed a combustible mixture of fuel and air through a pipe 18 for maintaining primary filaments from the spinner in condition for attenuation into fibers, and an annular blower associated with the spinner 14 is fed steam or compressed air through a pipe 20 for attenuating the primary filaments into fibers 22. An annular supply chamber 24 for a plurality of nozzles 26 is fed binder through a tube 28 for spraying the fibers 22 with the binder.

The fibers 22 are collected on a foraminous endless conveyor belt 30 having a suction chamber 32 below the upper flight thereof. Nozzles 34 supplied with compressed air keep an initial area of the upper flight of the conveyor belt 30 free of fibers 22 for easy exhaustion of waste gases. Glass fiber scrim 36 is fed from a supply roll 38 to the conveyor belt 30 beneath the fibers 22. The scrim 36 could be woven, but a non-woven scrim having only two strands per inch in one direction and three strands per inch in a cross direction has been found satisfactory. The scrim 36 and collected fibers 22 thereon are fed between two endless belts 40 and 42 extending through a curing oven 44 to produce a scrim faced glass wool blanket 46. The distance between the lower flight of the belt 40 and the upper flight of the belt 42 determines the thickness of the blanket 46, and the binder on the fibers 22 bonds the fibers to each other and to the scrim 36 as it is cured in the oven 44.

Figure 2:
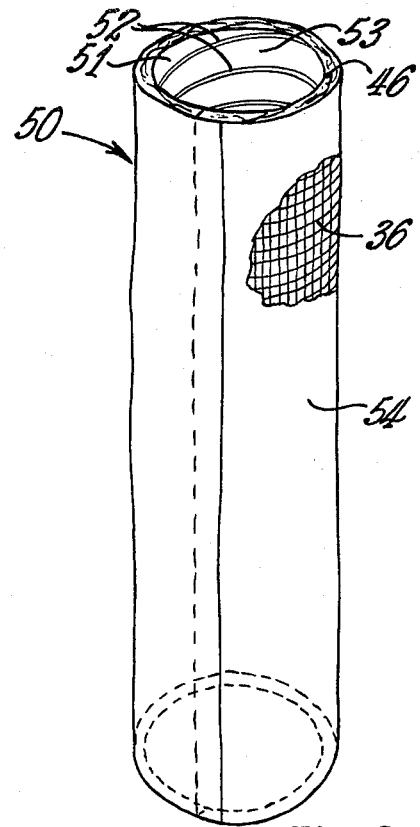
FIG. 2 is a perspective view of a length of flexible insulated air duct constructed in accordance with the invention.

FIG. 2 shows a length of flexible insulated air duct 50 constructed in accordance with the invention and including scrim-faced glass wool blanket material 46 wrapped around an inner core 51 of helically formed wire 52 entrapped in overlapping windings 53 of suitable material and covered by an outer jacket 54, which may be plastic film.

Figure 3:
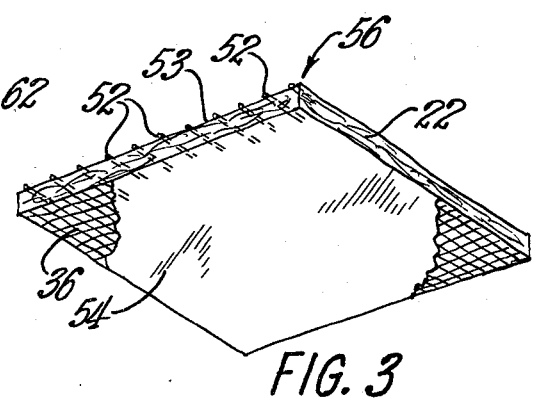
FIG. 3 is a perspective view of a test sample cut from a duct constructed in accordance with the invention and flattened out for testing, portions of the outer jacket material being omitted.

FIG. 3 shows a test sample 56 cut from a duct 50 and flattened out for testing.

Figure 4:
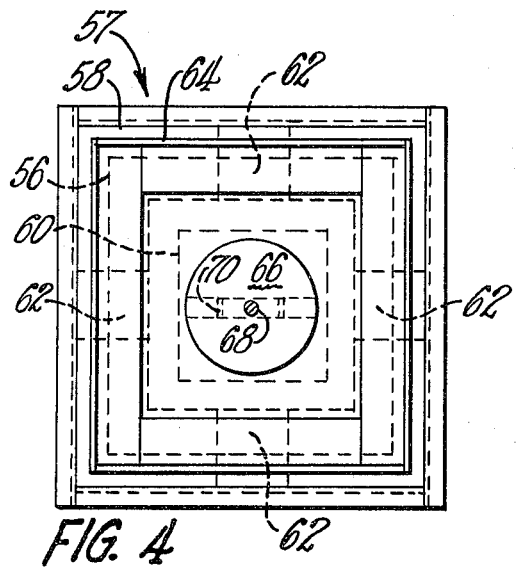
FIG. 4 is a top view of testing apparatus for conducting the flame-penetration test of Standard UL 181.
Figure 5:
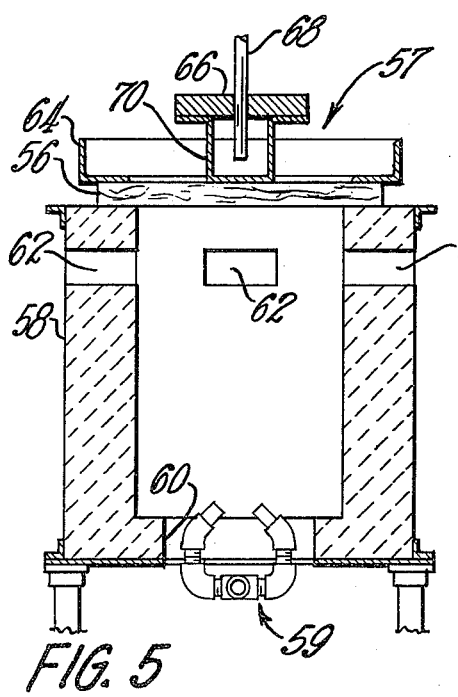
FIG. 5 is a vertical sectional view of the testing apparatus of FIG. 4.

FIGS. 4 and 5 show the test sample 56 in testing apparatus 57 for the flame-penetration test of Standard UL 181. The apparatus 57 includes a refractory-lined gas-fired combustion chamber 58 normally open at the top, but closed by the test sample 56. A dual-outlet gas burner 59 composed of appropriate pipe fittings is disposed in an opening 60 at the bottom of the combustion chamber 58. Each side wall of the combustion chamber 58 is provided with a vent opening 62. The gas supply to the burner 59 is to be regulated to provide a flow of fifty-three cubic feet per hour at a pressure of three and one-half inches of water, and the gas is to have a heating value of 1000 to 1050 BTU per cubic foot. The test sample 56 should be at least twenty inches square and is held in place by a hold-down frame 64. The orientation of the test sample 56 should be such that the surface which would form the inside surface of the duct 50 is facing up, away from the flame from the burner 59. The test sample 56 is centrally loaded between wires 52 with an eight-pound load applied over a one by four inch area. The load is supplied by a disk 66 mounted on a rod 68 and having a flanged generally U-shaped strip 70 secured to the bottom thereof by the flanges. The rod 68 is supported by means not shown to allow free vertical movement, the rod 68, disk 66, and strip 70 having a total weight of eight pounds. For a Class I air duct material rating, the sample has to retard the passage of flame for thirty minutes. It must not collapse or show evidence of perforation to an extent which would allow the direct passage of flame or gases, and no ignition must occur at the upper surface. A sample from duct constructed in accordance with this invention, but with the outer jacket material 54 removed, passed the test. The test sample was one and one-half inches thick. The scrim 36 apparently holds the glass fibers 22 in position long enough for a glaze to form at the bottom surface, and the glaze prevents penetration by the flame. Thus, with the relatively coarse glass fiber scrim 36 adhered directly on the glass wool insulation, any kind of an outer jacket may be used for the air duct. If plastic film were used for the outer jacket, even though it would disappear during the test, the scrim 36 would remain in place to enable passing of the test.

I claim:

1. A flexible insulated air duct (50) consisting essentially of a flexible cylindrical inner core (51) including a wire helix (52) with spaced convolutions, flexible scrim-faced glass wool blanket material (46) wrapped around the core (51) and including on its outer surface a glass scrim (36) having about two by three strands of glass filaments per square inch, and a flexible outer jacket (54) over the scrim-faced glass wool blanket material (46), a flattened sample of the duct wall being capable of passing the flame penetration test of Underwriters Laboratories Standard UL 181 for Class I air duct materials.

2. An insulated air duct (50) as claimed in claim 1 wherein the glass scrim (36) is a non-woven scrim.

* * * * *